United States Patent Office 3,616,501
Patented Nov. 2, 1971

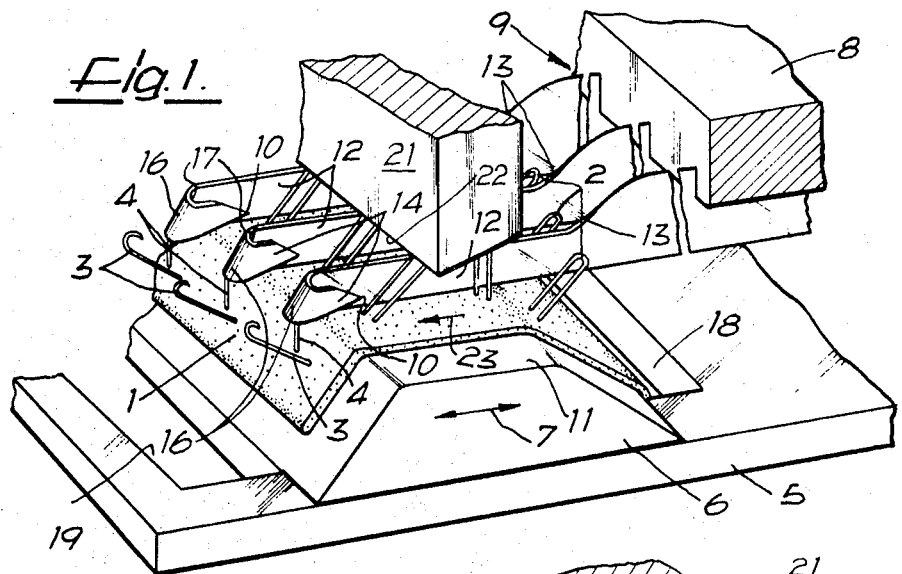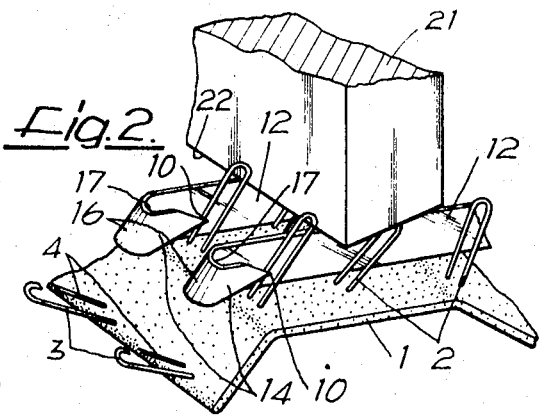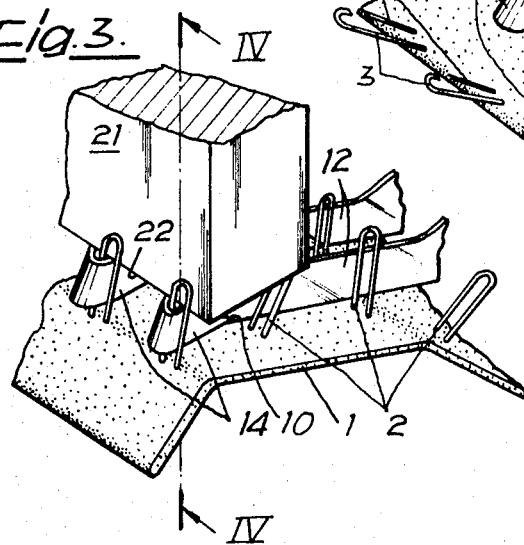

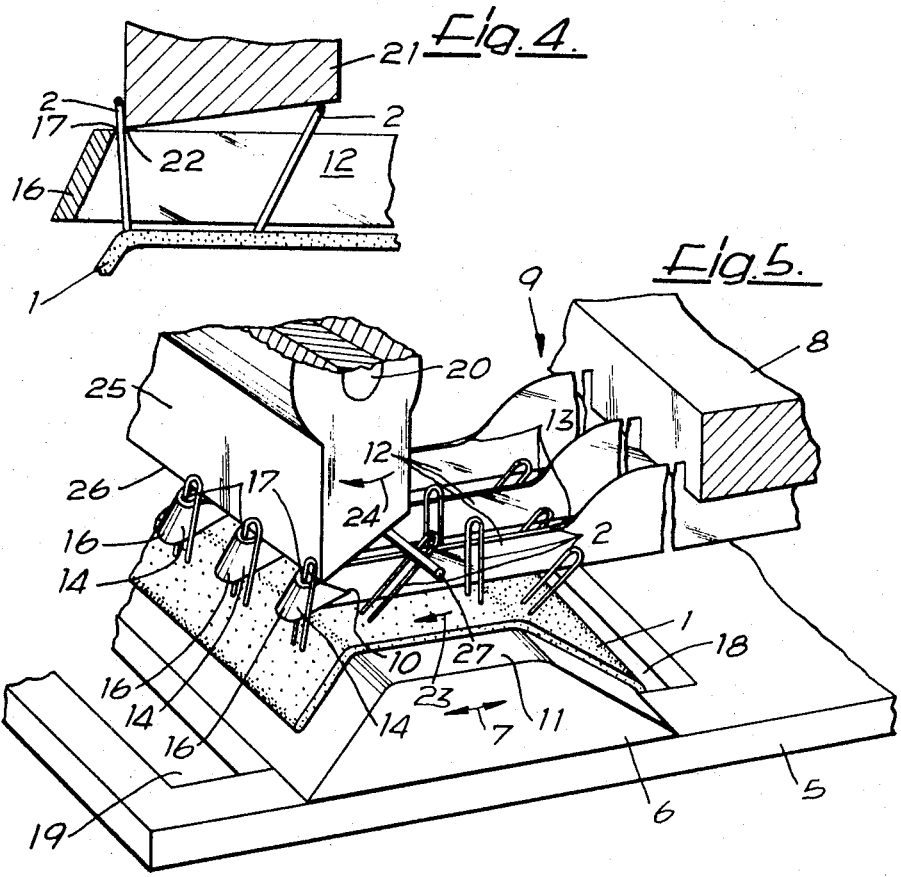

3,616,501
LOOP-CUTTING APPARATUS
Norbert Stefan Waller, Weil im Schonbuch, Germany, assignor to Fa. Gottlieb Binder, Baden-Wurttemberg, Germany
Filed June 23, 1970, Ser. No. 48,987
Claims priority, application Germany, June 27, 1969,
P 19 32 553.2
Int. Cl. D06c *13/08*
U.S. Cl. 26—9
7 Claims

ABSTRACT OF THE DISCLOSURE

An apparatus for cutting loops, which project from a surface, into two parts of unequal length, using a row of comb-like teeth whose free ends are bent back and formed each with a curved cutting edge. The row of curved cutting edges co-operates in scissors fashion with a transverse knife edge for cutting loops engaged on the free ends of the teeth.

BACKGROUND OF THE INVENTION

(1) Field of the invention

This invention relates to apparatus for cutting loops projecting from a surface, for example of material, into two parts of unequal length, by means of cutting edges co-operating in the manner of scissors and formed partly by teeth onto which the loops can be pushed by a relative movement between the surface and the teeth.

(2) Description of the prior art

Such an apparatus is already known in which the surface is moved in relation to a comb having the teeth in the direction from the ends of the comb teeth towards the back of the comb, so that the loops are arranged on the teeth of the comb. Co-operating with this comb is a second comb moving transversely to the teeth of the first comb and the teeth of which likewise form cutting edges by which the loops are cut in each case on one side. The main purpose of this known apparatus is to cut the loops of a textile material, e.g. a fabric, a woven material or a knitted material, in order to form hooks, so that the textile material can then be used as one half of a fastening means, the other half of which is formed by material having only loops so that when the two halves of the fastening means are pressed together, the hooks of one half engage the loops of the other half.

The known apparatus has the disadvantage that when the cut-open loops are pulled off the teeth, the parts of the loops which are bent into a hook shape have to be pulled off the teeth. This pulling off has to be so strong that this hook part of the loop is almost straightened, and this can mean that, after the loops are fixed (and in the case of thick strands being used for the loops) the hooks may tear or be partly broken, or in some cases permanently straightened, so adversely affecting their subsequent operation as fastening hooks.

A further disadvantage of the known apparatus, which is of importance not only for the manufacture of the hooked material for the above-mentioned fastening means, but also in an application of the apparatus for cutting open non-fixed loops into velvet-like structures, is that if there are negligible differences in graduation between the loops and the comb teeth, irregular cutting of the loops occurs so that the loops may in some cases be decapitated, to form bristles of equal length, while others are not cut at all.

It is an object of the invention to provide apparatus in which accurate cutting of all loops is ensured, and in which the hook-shaped parts of cut loops are not bent open after cutting.

SUMMARY OF THE INVENTION

According to this invention, there is provided apparatus for cutting loops projecting from a surface into two parts of unequal length, comprising: a series of comb-like teeth; means for producing movement of the surface and the loops lengthwise relative to the teeth; and a knife having a cutting edge which extends substantially transversely of the series of teeth; each tooth having a free end; each free tooth end being bent back to form a hook; the curved part of each hook having a cutting edge; and the bent back end of each hook being engageable into at least one loop; whereby on relative movement of the surface towards the free ends of the teeth the cutting edge of the knife co-operates scissor-wise with the row of cutting edges of the hooks.

Preferably the teeth are part of a comb with a back, the teeth projecting from the back, and the teeth being in the form of lancet-shaped flat springs disposed each with its sides at right angles to the said surface. The scissors-like co-operation between the cutting edge of the knife and the cutting edges of the hooks can be achieved by a reciprocating movement of the comb in relation to the knife, aligned substantially on the longitudinal axis of the teeth, or by a corresponding movement of the knife edge in relation to the comb.

By making the teeth in the form of lancet-like flat springs, they can adapt themselves to the gaps between the loops, particularly if the relative movement of the surface and hence of the loops in relation to the comb is directed from the back of the comb towards the ends of the flat springs. Thus, differences in graduation of the comb and of the loops can be compensated for and cannot lead to an irregular cut. Since the loops are cut by the curved parts of the hooks, the curved parts of the cut loops emerge immediately from the region of the flat springs without having to be bent open.

For the knife, it is possible to use a rotatable knife or a knife which reciprocates in the longitudinal direction of the flat springs on their upper edges. If a rotatable knife is used, it is advantageous for the width of the flat springs to be, in the zone of movement of the cutting edge of the knife, of a width less than the length of the loops, and to provide outside the path of movement of the cutting edge a deflecting member to retain any loops which have not yet been cut and which is stationary with respect of the comb and extends parallel with the rotary axis of the knife, immediately above the top edges of the flat springs. When a row of loops is cut open, this deflecting member holds back the loops of the next row until the moment that their roots have reached an accurately defined position for cutting. In that moment, the loops accelerate forwardly under the deflecting member and into the path of movement of the knife, so that they can then be cut by the cutting edge of the knife. This ensures that the cutting location can be accurately maintained.

In an embodiment with a reciprocating knife, it is expedient, in order to adjust the position of at least the rear point of reversal of the knife stroke which is towards the back of the comb, to provide an adjusting means so that a desired point of cut on the loops can be adjusted, or the apparatus adapted to various lengths of loop. In this case, the reciprocating knife functions in a manner similar to the deflecting member of the embodiment which has a rotatable knife. By adjusting the position of the rear reversal point, it is possible to ensure, according to the length of the loops, that during cutting one row of loops, the next row of loops is held by the knife outside the cutting path of the knife edge.

The cutting location can also be influenced by displacement of the means supporting the goods.

BRIEF DESCRIPTION OF THE DRAWINGS

FIG. 1 is a perspective oblique view of a first embodiment, with parts broken away;

FIGS. 2 and 3 are partial views corresponding to FIG. 1 showing the apparatus in various working phases;

FIG. 4 is a cross-section on line IV—IV of FIG. 3; and

FIGS. 5 and 6 are views corresponding to FIGS. 1 and 2, but showing a second embodiment.

DESCRIPTION OF THE PREFERRED EMBODIMENTS

The two embodiments serve to cut loops 2, which project from the surface of material 1, into two parts of unequal length, namely a hook 3 and a residual portion 4.

As seen from FIGS. 1 and 5, both embodiments agree in the following respects. Mounted on a base plate 5 is a guide member 6 for the material 1, the member 6 being connected to the plate 5 for adjustment in the direction of the double-headed arrow 7. For such connection it is possible to use screws passing through elongated holes which extend in the base plate 5 in the direction of the double-headed arrow 7, the screws entering from below into the guide member 6. Rigidly connected to the base plate 5 is the back 8 of the comb 9 the teeth of which are formed by lancet-like flat springs 12 disposed with their side faces at right angles to a guide face 11 of the guide member 6. For clarity, only a few flat springs are shown. In practice a plurality of flat springs 12 is connected to the back 8. In the embodiments illustrated, the flat springs 12 (preferably of steel) have their upper edges engaged in grooves in the back 8 and are connected rigidly thereto, for example, by press-fitting or soldering. The flat springs 12 may however be integral with the back 8.

With the exception of the part which is joined to the back 8 each flat spring 12, from a location 13 forwards, has a width, measured at right angles to its length, which is less than the length of a loop 2. The free end of each flat spring 12 is bent to form a hook 14, which ends in a point 10. The curved part 16 of the hook has a cutting edge 17 on its inner upper edge.

To feed the loops 2 to the cutting edges 17 a device (not shown) moves the strip-shaped material 1. This device may be arranged beneath the base plate 5. For this purpose, there are provided in the base plate 5, on both sides of the guide member 6, broad slots 18 and 19 which extend over the entire width of the material 1, so that the latter can be fed through the slot 18 to the guide face 11 and removed through the slot 19. The material 1 is in this case so fed to the flat springs 12 that the latter engage between the rows of loops 2. As soon as a loop 2 arrives at the end of an adjacent flat spring 12, the relevant hook 14 engages in the loop (see FIG. 3).

To cut open the loops 2 at a desired place in order to form a hook 3 and a residual portion 4, the embodiment of FIGS. 1 to 4 has, above the flat springs 12, a knife 21 which, for scissors-like co-operation with a row of cutting edges 17, has on its side which is towards the hooks 14, a cutting edge 22 which extends at right angles to the flat springs, and rests on the upper edges of the springs. The knife 21 is mounted for reciprocating movement parallel with the length of the flat springs 12 and relatively thereto, and is connected to a drive (not shown). The length of stroke of the knife 21 is such that (according to the length of the loops 2 and to the position of the desired cut in the loops 2), at its rear point or reversal (which is towards the back 8, as shown in FIG. 2) a row of loops 2 parallel to the cutting edge 22 is exposed so that their upper ends can lift over the upper edges of the adjacent springs 12, and so that at its front point of reversal it lies on that side of the cutting edges 17 which is directed away from the rear reversal point.

A preferably continuous drive is provided to move the material 1.

The movements of the material 1 and of the knife 21 are so related that the cutting edge 22 always cuts the loops 2 at a clearly defined point. This point can also be adjusted by displacement of the guide member 6 in the direction of the double-headed arrow 7.

During operation, the material 1 moves either step-wise or continuously in the direction of the arrow 23. At the same time, the knife 21 reciprocates parallel with the lengths of the flat springs 12. As can be seen from FIG. 2, at the rear reversal point of the knife 21, a row of loops 2 parallel with the cutting edge 22 is exposed by the knife, and as shown these loops take up a position in front of the knife. Upon subsequent forward movement of the knife 21, the loops are moved by the cutting edge 22 towards the curved cutting edges 17. At the same time the loops are pushed over the pointed ends 10, so that when the cutting edge 22 encounters the curved cutting edges 17, those arms of the loops 2 which are in the hooks 14 are cut, see FIGS. 3 and 4. After this cut, the formed hook 3 is pushed beyond the end of the flat spring, without the hook 3 having to be bent open.

The second embodiment shown in FIGS. 5 and 6 differs from the first in that, instead of the reciprocating knife 21, it has a knife 25 rotating in the direction of the arrow 24, the axis of rotation 20 of which is parallel with the row formed by the curved cutting edges 17, and which has a cutting edge 26 corresponding to the cutting edge 22.

Outside the path of movement of the cutting edge 26, on that side which is towards the back 8, there is a deflecting member for holding back any loops 2 uncut after passage of the cutting edge 26. This deflecting member is a rod 27 extending at right angles to the flat springs 12, and stationary with respect to the comb 9. In the second embodiment, the rod 27 holds back the loops 2 which, in the first embodiment, was done by the knife 21 itself. In order that, for different lengths of loops 2, the rod 27 should always release the loops 2 at the right time while the cutting edge 26 is passing, the rod is adjustable parallel to the lengths of the flat springs 12. The means for adjusting the rod 27 can also be so arranged that the distance of the rod 27 from the top of the flat springs 12 can be adjusted.

During operation of the second embodiment, the knife 25 rotates. At the same time, the material 1, is continuously moved in the direction of the arrow 23. As soon as the rod 27 has released a row of loops 2, they straighten up and are pushed over the ends 10 of the hooks 14 by the forward feed of the material 1. In the same way as with the first embodiment (FIG. 4) the cutting edge 26 performs the cut, a whole row of loops being simultaneously cut to form loop hooks 3. During this cutting, the hooks 3 are pushed over the curved parts 16 of the hooks.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

I claim:

1. Apparatus for cutting loops projecting from a surface into two parts of unequal length, comprising:
   a series of comb-like teeth;
   the surface and the loops moving lengthwise relative to the teeth; and
   a knife having a cutting edge which extends substantially transversely of the series of teeth;
   each tooth having a free end;
   each free tooth end being bent back to form a hook;
   the curved part of eac hhook having a cutting edge; and
   the bent back end of each hook being engageable into at least one loop;

whereby on relative movement of the surface towards the free ends of the teeth the cutting edge of the knife co-operates scissor-wise with the row of cutting edges of the hooks.

2. Apparatus according to claim 1 and comprising a comb with a back, the teeth projecting from the back, and the teeth being in the form of lancet-shaped flat springs disposed each with its sides at right angles to the said surface.

3. Apparatus according to claim 2, wherein the parts of the flat springs located in the zone of movement of the cutting edge of the knife are each of width less than the length of the loops.

4. Apparatus according to claim 1, said knife being rotatable and having an axis of rotation which extends substantially parallel with the row of cutting edges.

5. Apparatus according to claim 4, wherein a deflecting member is disposed outside of the path of movement of the cutting edge of the knife, the deflecting member serving to hold back uncut loops, being stationary with respect to the teeth, and extending directly above the upper edges of the teeth and parallel with the axis of rotation of the rotatable knife.

6. Apparatus according to claim 1, wherein the knife reciprocates, in the longitudinal direction of the teeth on their upper edges, the cutting edge of the knife extending parallel with the row formed by the cutting edges of the teeth.

7. Apparatus according to claim 6, wherein, for adjusting the position of at least a rear reversal point of the knife stroke, adjusting means is provided.

References Cited

UNITED STATES PATENTS

| | | | |
|---|---|---|---|
| 2,933,797 | 4/1960 | De Mestral | 26—9 |
| 3,083,737 | 4/1963 | De Mestral | 26—9 X |
| 3,530,687 | 9/1970 | Hamano | 26—9 X |
| 3,550,223 | 12/1970 | Erb | 26—9 UX |

FOREIGN PATENTS

| | | | |
|---|---|---|---|
| 285,060 | 5/1966 | Australia | 26—9 |
| 2,040 | 12/1963 | Japan | 26—11 |
| 180,169 | 9/1966 | U.S.S.R. | 26—8 R |
| 422,406 | 4/1967 | Switzerland | 26—9 |

ROBERT R. MACKEY, Primary Examiner

U.S. Cl. X.R.

139—291 C